(12) United States Patent
Jensen

(10) Patent No.: US 9,062,821 B2
(45) Date of Patent: Jun. 23, 2015

(54) APPARATUS FOR SUSPENDING AND RELEASABLY HOLDING AN ELECTRONIC MEDIA DEVICE HAVING A VIEWABLE SCREEN

(76) Inventor: Erik D. Jensen, Batavia, IL (US)

(*) Notice: Subject to any disclaimer, the term of this patent is extended or adjusted under 35 U.S.C. 154(b) by 394 days.

(21) Appl. No.: 13/506,553

(22) Filed: Apr. 27, 2012

(65) Prior Publication Data

US 2013/0286555 A1  Oct. 31, 2013

(51) Int. Cl.
| | | |
|---|---|---|
| A47B 97/02 | (2006.01) | |
| F16M 11/04 | (2006.01) | |
| F16M 11/10 | (2006.01) | |
| F16M 13/00 | (2006.01) | |
| F16M 13/02 | (2006.01) | |

(52) U.S. Cl.
CPC ............ F16M 11/041 (2013.01); F16M 11/10 (2013.01); F16M 13/00 (2013.01); F16M 13/022 (2013.01); F16M 2200/024 (2013.01)

(58) Field of Classification Search
CPC .......... B43L 1/00; A47B 97/04; A47B 97/08; A47B 97/02; A47B 96/00; A47B 23/042; A47B 23/02; A47B 23/044; A47B 23/043; A47B 23/045; A47B 23/06; A47B 9/00; A47B 9/16; B60R 11/0252; B60R 11/0264; B60R 11/001; B60R 11/0059; B60R 11/0075; B60R 11/0002; B60R 11/0085; F16M 13/00; F16M 13/02; F16M 13/022
USPC ......... 248/917–924, 447, 448, 449, 451, 452, 248/453, 454, 455, 458, 460, 462, 463, 464, 248/324, 323, 339, 340, 346.07, 346.06, 248/670, 341
See application file for complete search history.

(56) References Cited

U.S. PATENT DOCUMENTS

| | | | | | |
|---|---|---|---|---|---|
| 327,816 | A | * | 10/1885 | Newbourg | 248/460 |
| 774,264 | A | * | 11/1904 | Moreland | 248/449 |
| 918,045 | A | * | 4/1909 | Hartman | 248/452 |
| 1,074,430 | A | * | 9/1913 | Hill | 248/448 |
| 1,077,853 | A | * | 11/1913 | Osborn | 248/451 |
| 1,197,351 | A | * | 9/1916 | Dalglish | 248/464 |
| 1,269,925 | A | * | 6/1918 | Gauntt | 248/452 |
| 1,402,483 | A | * | 1/1922 | Evans | 248/460 |
| 1,445,179 | A | * | 2/1923 | Seymour | 248/452 |
| 1,554,211 | A | * | 9/1925 | Halevy | 248/464 |
| 1,769,232 | A | * | 7/1930 | Olsen | 248/464 |
| 1,872,911 | A | * | 8/1932 | Draxler | 248/451 |
| 1,888,756 | A | * | 11/1932 | Brownstein | 248/464 |
| 1,938,528 | A | * | 12/1933 | Marseglia | 248/444 |
| 2,143,368 | A | * | 1/1939 | Binder | 248/464 |
| 2,193,215 | A | * | 3/1940 | Witter | 248/59 |
| 2,289,695 | A | * | 7/1942 | Bryant | 248/150 |

(Continued)

*Primary Examiner* — Nkeisha Smith
(74) *Attorney, Agent, or Firm* — Law Office of John W. Harbst

(57) ABSTRACT

An apparatus for releasably holding an electronic media device having a generally flat screen on which an image can be electronically displayed. In one form, such apparatus includes a base including hinged first segment and a second segments whereby allowing the base segments to be adjustably positioned and held in selected angular positions relative to each other so as to substantially reduce an operative length of the base and facilitate storage and transportation of the apparatus. The first segment of the apparatus includes structure for suspending the base from a support. The second segment of the apparatus includes structure for receiving, releasably holding and stabilizing the electronic media device with the generally flat screen of such device facing away from the front of the base.

18 Claims, 11 Drawing Sheets

(56) References Cited

U.S. PATENT DOCUMENTS

| | | | | |
|---|---|---|---|---|
| 2,369,348 A * | 2/1945 | Gore | | 248/451 |
| 2,568,354 A * | 9/1951 | Moore | | 248/448 |
| 2,648,155 A * | 8/1953 | Shea | | 248/451 |
| 2,707,350 A * | 5/1955 | Schaffner | | 248/458 |
| 2,730,835 A * | 1/1956 | Weir | | 248/449 |
| 3,139,045 A * | 6/1964 | Rojakovick | | 108/109 |
| 3,142,128 A * | 7/1964 | Cicco | | 248/448 |
| 3,391,891 A * | 7/1968 | Garden | | 248/311.2 |
| 3,550,786 A * | 12/1970 | Brown | | 211/189 |
| 3,562,796 A * | 2/1971 | Jacobson | | 48/456 |
| 3,643,606 A * | 2/1972 | Vise | | 108/44 |
| 3,685,708 A * | 8/1972 | Herrington | | 224/483 |
| 3,799,488 A * | 3/1974 | Sena | | 248/452 |
| 3,862,696 A * | 1/1975 | McCauley et al. | | 414/466 |
| D244,754 S | 6/1977 | Bard | | D15/66 |
| 4,108,084 A * | 8/1978 | Fink | | 108/29 |
| 4,295,619 A * | 10/1981 | Kulin et al. | | 248/95 |
| 4,412,677 A * | 11/1983 | Viramontes | | 482/39 |
| 4,448,384 A * | 5/1984 | Jones et al. | | 248/443 |
| 4,470,571 A * | 9/1984 | Hartman | | 248/452 |
| 4,482,185 A * | 11/1984 | Zoellner | | 297/135 |
| 4,562,656 A * | 1/1986 | Kristofich | | 40/733 |
| 4,634,032 A * | 1/1987 | LaFlame | | 224/265 |
| 4,691,885 A * | 9/1987 | Lawrance | | 248/165 |
| 4,856,749 A * | 8/1989 | Habermann | | 248/448 |
| 4,917,343 A * | 4/1990 | Wainscott | | 248/447.2 |
| 4,949,924 A * | 8/1990 | Carmody | | 248/215 |
| 4,969,623 A * | 11/1990 | Bernier | | 248/441.1 |
| 4,982,925 A * | 1/1991 | Hinderliter | | 248/455 |
| 5,129,616 A * | 7/1992 | Carson | | 248/457 |
| 5,177,665 A * | 1/1993 | Frank et al. | | 361/679.43 |
| 5,316,256 A * | 5/1994 | Siebenaler et al. | | 248/453 |
| 5,320,321 A * | 6/1994 | Muncada | | 248/447.2 |
| 5,330,147 A * | 7/1994 | Volcheff et al. | | 248/316.4 |
| 5,413,035 A * | 5/1995 | Fernandez | | 100/44 |
| 5,542,314 A * | 8/1996 | Sullivan et al. | | 74/552 |
| 5,662,047 A * | 9/1997 | Metcalf | | 108/44 |
| 5,709,365 A * | 1/1998 | Howard | | 248/454 |
| 5,713,499 A * | 2/1998 | Daniel | | 224/401 |
| 5,749,306 A * | 5/1998 | Breuner | | 108/44 |
| 5,810,299 A * | 9/1998 | Poulos | | 248/96 |
| 5,810,314 A * | 9/1998 | Raziano | | 248/371 |
| 5,813,354 A * | 9/1998 | Scott | | 108/44 |
| 5,833,178 A * | 11/1998 | Plasse et al. | | 248/27.8 |
| 6,082,692 A * | 7/2000 | Price | | 248/278.1 |
| 6,435,172 B1 * | 8/2002 | Freemon | | 126/25 B |
| 6,488,244 B2 * | 12/2002 | Ruan et al. | | 248/118.1 |
| 6,505,797 B1 * | 1/2003 | Dempsey | | 248/166 |
| 6,590,767 B2 * | 7/2003 | Liao et al. | | 361/679.02 |
| 6,773,060 B2 * | 8/2004 | Sher et al. | | 297/188.14 |
| 7,017,878 B2 * | 3/2006 | Guo et al. | | 248/309.1 |
| 7,032,872 B2 * | 4/2006 | Sullivan | | 248/346.07 |
| 7,086,190 B2 * | 8/2006 | Voluckas | | 40/617 |
| 7,216,789 B2 * | 5/2007 | Caradimos | | 224/276 |
| 7,266,933 B2 * | 9/2007 | Pasek | | 52/749.1 |
| 7,448,688 B2 * | 11/2008 | Farah | | 297/423.39 |
| 7,568,915 B1 | 8/2009 | Lavoie | | 434/408 |
| 7,611,112 B2 * | 11/2009 | Lin | | 248/274.1 |
| 7,628,717 B2 * | 12/2009 | Purcell et al. | | 473/483 |
| 7,735,799 B1 * | 6/2010 | Antici | | 248/454 |
| 8,240,626 B2 * | 8/2012 | Kennedy | | 248/308 |
| 8,353,490 B2 * | 1/2013 | Spinelli | | 248/201 |
| 8,424,825 B2 * | 4/2013 | Somuah | | 248/316.4 |
| 8,474,778 B2 * | 7/2013 | Jacobson | | 248/492 |
| 8,511,486 B2 * | 8/2013 | Mansor | | 211/117 |
| 8,608,037 B2 * | 12/2013 | Stroh et al. | | 224/276 |
| 8,657,130 B2 * | 2/2014 | Thrush et al. | | 211/117 |
| 2006/0060738 A1 * | 3/2006 | Whittington et al. | | 248/295.11 |

\* cited by examiner

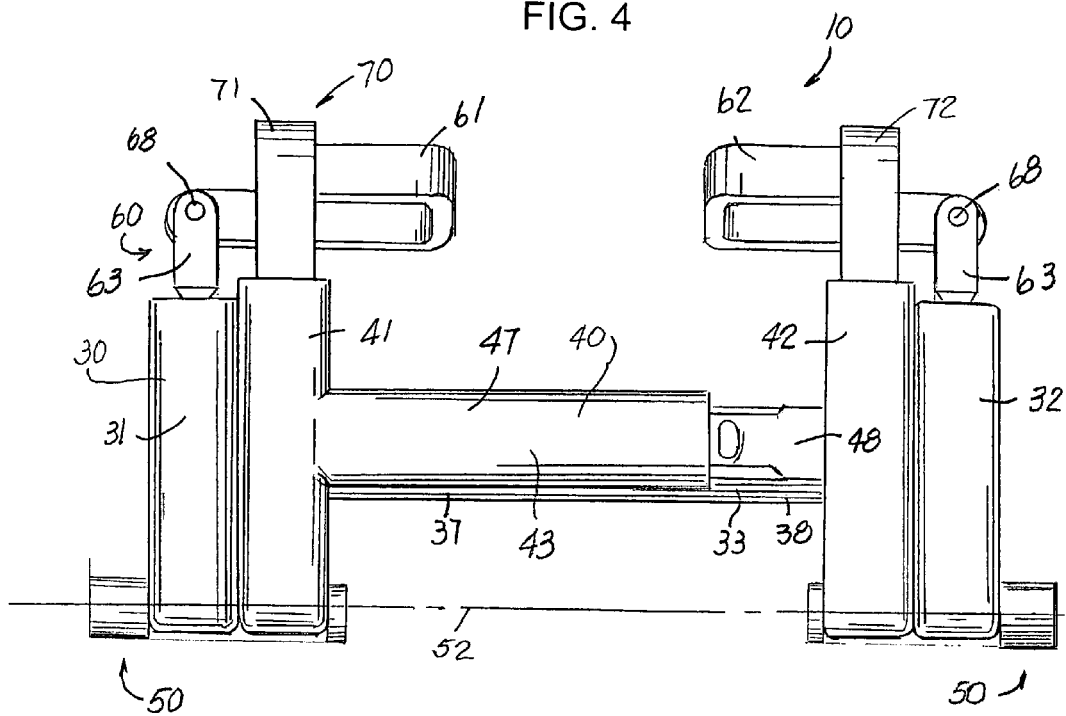
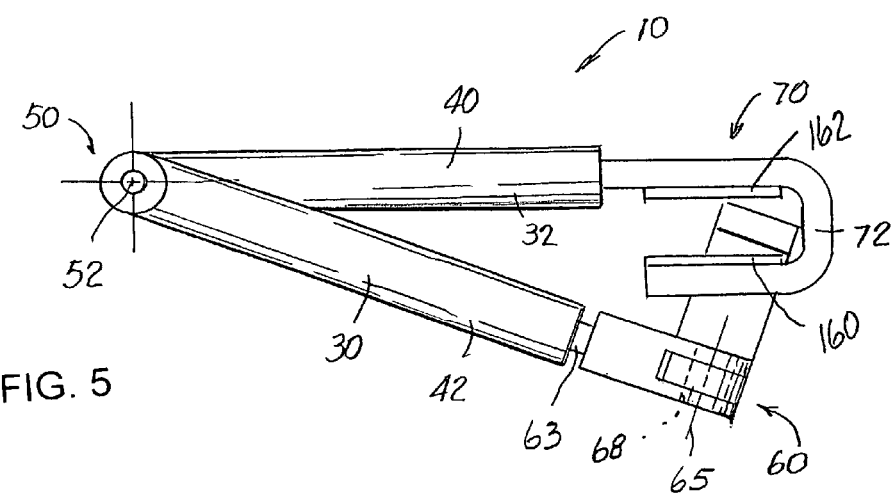

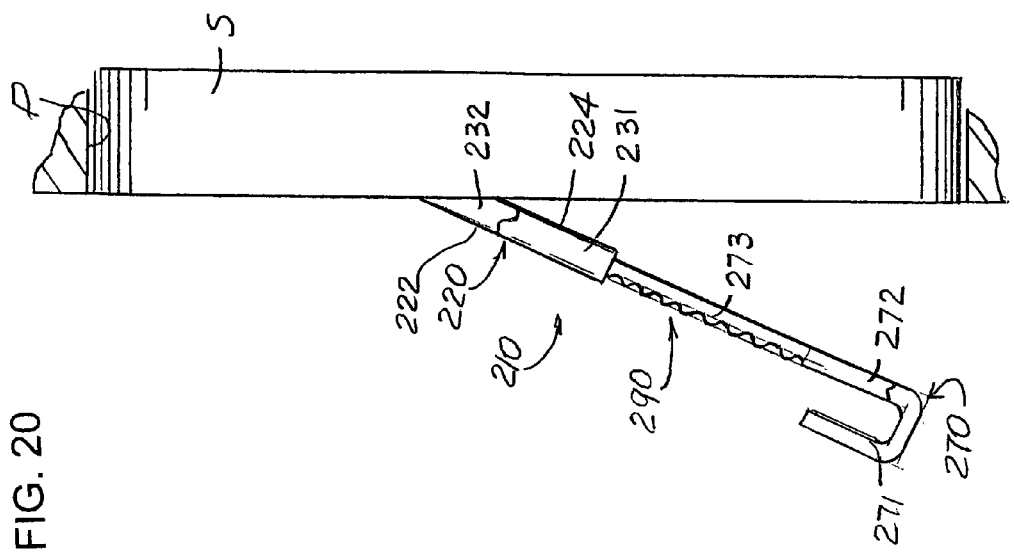
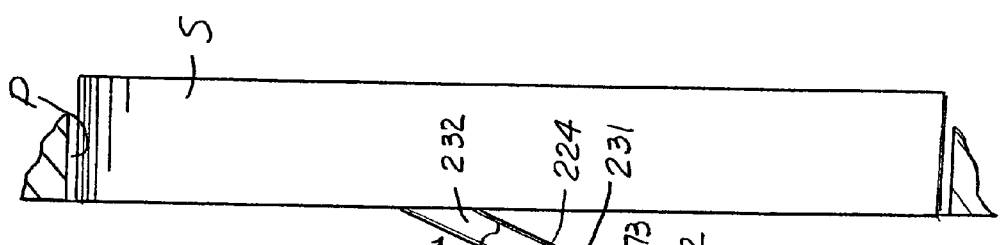
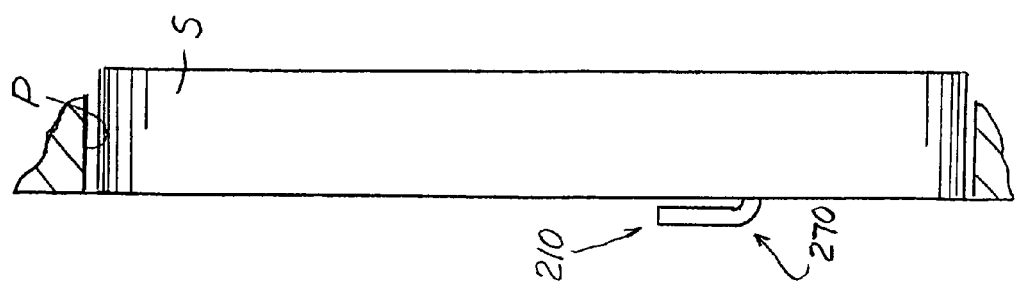

APPARATUS FOR SUSPENDING AND RELEASABLY HOLDING AN ELECTRONIC MEDIA DEVICE HAVING A VIEWABLE SCREEN

FIELD OF THE INVENTION DISCLOSURE

This invention disclosure generally relates to an apparatus of releasably holding an electronic media device for viewing and, more specifically, to an apparatus which suspends, releasably holds, stabilizes and allows for adjustment of the electronic media device to enhance the viewing pleasure thereof.

BACKGROUND

As used herein and throughout, the phrase or term "electronic media device" is meant to include any form of "i-Pad®", "Blackberry®", PDA, and "Android" tablet, cellular telephone, or other suitable hand-held audio-visual device having a relative small screen on which an electronic image can be displayed, programmed, played, and viewed.

The portability of such electronic media devices advantageously allows them to be used in a variety of different places, i.e. in a car, on an airplane, at the office and etc. One of the disadvantages, however, of using such devices relates to the ability to view the screen from different angles. That is, to enhance viewability of the display screen on such devices typically requires a user to continuously hold, adjust and position the device in their hands. Physically holding the usually small electronic media device in one's hand to enhance viewing of the display screen can become tedious and tiresome especially when viewing a long movie or the like. Having to hold the electronic media device in one's hand while driving can also substantially impair the driver's ability to pay proper attention. The problem of viewing the display screen while a passenger in an automobile can be exacerbated by the uneven terrain over which the automobile may be moving.

Devices for securing an electronic media device to a steering wheel of a vehicle are known in the art. Such devices, however, are relatively large, stiff platforms that cannot be collapsed or reduced in size so as to facilitate storage in a relatively confined space. It will be quickly appreciated how storage of such devices presents serious concerns when considering space can be restricted and severely limited such as travel bags or the like to be carried on an airplane. Moreover, most of these known devices do not permit adjustment of the angle of the display screen relative to the person trying to view same.

Thus, there remains a need and desire for an apparatus which can suspend and releasably hold an electronic media device such that it does not have to be hand held while traveling, which permits adjustment of the angular pitch with which the screen on the device is disposed relative to the viewer thereof and which, preferably, is collapsible to facilitate storage in a relatively confined space.

SUMMARY

In view of the above, and in accordance with one aspect, there is provided an apparatus for releasably holding an electronic media device having a generally flat screen on which an image can be electronically displayed. Such apparatus includes an elongated base for supporting the electronic media device. The base has an upper region, a lower region, a front and a back. Such apparatus further includes structure arranged toward the upper region of the base for suspending the base from a support along with structure arranged toward the lower region of the base for receiving, releasably holding and stabilizing the electronic media device with the generally flat screen of the device facing away from the front of the base. According to this aspect of the invention disclosure, structure is disposed between the upper region and the lower region of the base for adjustably positioning and releasably holding the lower and upper regions of the base about a generally horizontal pivot axis and relative to each other so as to enhance visualization of the generally flat screen of the electronic media device. The structure for adjustably positioning and releasably holding the lower and upper regions of the base includes a clutch mechanism comprising two independent and manually operable mechanisms arranged along and about the pivot axis. In one form, each mechanism includes pair of wedge-lock washers arranged in face-to-face confronting relation relative to each other.

Preferably, the upper region of the base comprises a first pair of elongated and laterally spaced support arms. Preferably, the lower region of the base comprises a second pair of elongated and laterally spaced support arms. The pairs of elongated and laterally spaced support arms comprising the upper and lower regions of the base are preferably interconnected to each other by hinge structure.

In one form, the base further includes upper and lower cross-pieces for maintaining the respective pairs of elongated and laterally spaced support arms in generally parallel spaced relation relative to each other. Preferably, the upper and lower cross-pieces are each structured so as to permit an operational width of the base to be collapsed by moving the pairs of elongated and laterally spaced support arms laterally relative to each other.

In one embodiment, the upper region of the base and the structure for suspending the base from the support are configured relative to each other such that an operative length of the base of the apparatus can also be lengthwise adjusted. In another form, the lower region of the base and the structure for receiving, releasably holding and stabilizing the electronic media device are configured relative to each other such that an operative length of the base of the apparatus can be furthermore lengthwise adjusted.

The structure arranged toward the upper region of the base for suspending the base from a support preferably includes generally hook-shaped members extending away from the back of the base. Preferably, the hook-shaped members of the structure for suspending the base from a support are pivotally movable relative to the base.

The structure arranged toward the lower region of the base for receiving, releasably holding and stabilizing the electronic media device with the generally flat screen of the device facing away from the front of the base preferably includes generally hook-shaped members extending away from the front of the base. In another preferred form, the apparatus for holding the electronic media device furthermore preferably includes straps extendable from the upper region of the base for suspending the base from a support.

According to another aspect of this invention disclosure, there is provided an apparatus for releasably holding an electronic media device having a generally flat screen on which an image can be electronically displayed. Such apparatus includes an elongated base for supporting the electronic media device. The base has an upper region, a lower region, a front and a back, with an operative length and operative width of the apparatus being adjustable so as to permit an overall size of the apparatus to be reduced to facilitate storage of the apparatus when not in use. Such apparatus furthermore includes structure arranged toward the upper region of the base for suspending the base from a support during use. Moreover, structure is arranged toward the lower region of the base for receiving, releasably holding and stabilizing the electronic media device during use, with the generally flat screen of the device facing away from the front of the base. The base further includes structure for adjustably positioning and releasably holding the lower and upper regions of the base relative to each other and about a generally horizontal axis to enhance visualization of the generally flat screen of the electronic media device. The structure for adjustably positioning and releasably holding the lower and upper regions of the base relative to each other includes a clutch mechanism arranged along and about the generally horizontal axis. In one form, the clutch mechanism includes at least two wedge-lock washers arranged in face-to-face confronting relation relative to each other.

Preferably, the structure arranged toward the upper region of the base for suspending the base from the support includes generally hook-shaped members extending away from the back of the base. The hook-shaped members of the structure arranged toward the upper region of the base for suspending the base from the support are pivotally movable relative to the base. In one form, the apparatus for releasably holding an electronic media device further includes straps extendable from the upper region of the base for suspending the base from a support disposed remote from the apparatus of this invention disclosure.

According to another aspect of this invention disclosure, there is provided an apparatus for releasably holding an electronic media device having a generally flat screen on which an image can be electronically displayed. Such apparatus includes an elongated base including a first segment and a second segment joined to the first segment by hinge structure to allow the second segment to be adjustably positioned and held between a first position, wherein the second segment extends at an angle relative to the first segment, and a second position, wherein the first and second segments are collapsed relative to each other to substantially reduce an operative length of the base whereby facilitating storage and transportation of the apparatus. In this embodiment, the apparatus includes structure extending in a first direction away from and arranged toward an upper region of the first segment for suspending the base from a support. Moreover, the apparatus further includes structure extending in a direction opposed to the first direction and arranged toward the lower region of the second segment of the base for receiving, releasably holding and stabilizing the electronic media device with the generally flat screen of such device facing away from the front of the base. A clutch mechanism is arranged in operable combination with the hinge structure for releasably maintaining the second segment of the base in position relative to the first segment of the base. In this embodiment, the clutch mechanism is arranged along and about the generally horizontal axis and comprises at least two wedge-lock washers arranged in face-to-face confronting relation relative to each other.

In this embodiment, the first segment of the base includes first and second elongated and laterally spaced support arms while the second segment of the base preferably includes third and fourth elongated and laterally spaced support arms. Preferably, the first and second support arms of the first segment of the base along with the structure for suspending the base from the support are configured relative to each other such that an operative length of the base of the apparatus can be lengthwise adjusted.

The third and fourth support arms of the second segment of the base along with the structure for receiving, releasably holding and stabilizing the electronic are also preferably configured relative to each other such that an operative length of the base of the apparatus can be lengthwise adjusted. In one form, the structure for suspending the base from the support includes generally hook-shaped members extending from the base for allowing the apparatus to be suspended from the support. The hook-shaped members of the structure for suspending the base from the support are preferably pivotally movable relative to the base.

According to yet another aspect, there is provided an apparatus for releasably holding an electronic media device having a generally flat screen on which an image can be electronically displayed, with such apparatus having a first end, a second end, and a base for supporting the electronic media device in a position to enhance viewing thereof, and with the base also having a first segment, a second segment, a front and a back. Structure is arranged toward the second end of the apparatus and in operable combination with the base for receiving, releasably holding and stabilizing the electronic media device with the generally flat screen of said device facing away from the front of the base. In this embodiment, structure is disposed between and joins the first and second segments of the base so as to permit the first base segment to rotate relative to the second base segment about a generally horizontal axis. The structure disposed between and joining the first and second base segments includes a clutch assembly for releasably holding the first and second base segments in selected angular relation relative to each other. In this embodiment, the clutch assembly is arranged along and about the generally horizontal axis and comprises at least two wedge-lock washers arranged in face-to-face confronting relation relative to each other. Preferably, one wedge-lock washer is operably associated with the first segment of the base while the second wedge-lock washer is operably associated with the second segment of the base. To permit the apparatus to assume a free-standing position, the structure arranged toward the first end of the base has a first covering on an exterior thereof for enhancing the ability of the structure arranged toward first end of the base to grip a surface on which the apparatus is supported with the first and second ends of the base being disposed to opposed sides of the generally horizontal axis. In this embodiment, the apparatus furthermore includes a second exterior covering disposed toward a second end of the apparatus for enhancing the ability of the apparatus to grip the surface on which the apparatus is supported with the first and second ends of the base are disposed to opposed sides of the generally horizontal axis.

In one form, the first segment of the base and the structure for receiving, releasably holding and stabilizing the electronic media device are configured relative to each other such that an operative length of the base of the apparatus can be lengthwise adjusted.

Preferably, the apparatus for releasably holding the electronic media device further includes structure arranged toward the first end of the apparatus for suspending the base from a support. In this embodiment, the upper segment of the base and the structure arranged toward the first end of the apparatus for suspending the base from a support are configured relative to each other so as to permit an operable length of the base to be lengthwise adjusted. In one form, the structure arranged toward the first end of the apparatus for suspending the base from a support includes generally hook shaped members which are pivotally movable relative to the base.

According to still another aspect, there is provided an apparatus for releasably holding an electronic media device having a generally flat screen on which an image can be electronically displayed. According to this aspect, the apparatus includes an elongated base having a front and a back. Structure is arranged in operable combination with the base for receiving, releasably holding and stabilizing the electronic media device with the generally flat screen of the device facing away from the front of the base. Also, structure is arranged in operable combination with the base for pivotally connecting the base to a generally upright support for pivotal movement about a generally horizontal axis and for releasably maintaining the base in an adjusted angular position relative to the generally upright support to enhance visualization of the generally flat screen of said electronic media device.

In this form, the base and structure for receiving, releasably holding and stabilizing the electronic media device are preferably configured relative to each other such that an operative length of the base of the apparatus can be lengthwise adjusted. Preferably, the structure arranged toward the lower section of the base for receiving, releasably holding and stabilizing the electronic media device with the generally flat screen of the device facing away from the front of the base includes generally hook-shaped members extending away from the front of the base.

DESCRIPTION OF THE DRAWINGS

FIG. 4 is another front elevation view of the apparatus illustrated in FIG. 1 in a collapsed or storage condition;

FIG. 5 is side elevational view of the apparatus illustrated in FIG. 4 in a collapsed or storage condition;

FIGS. 19 through 21 are side elevational views, partially broken away, of the apparatus shown in FIG. 18 in different angular and longitudinally adjusted positions relative to the generally vertical support on which such apparatus is arranged in operable combination.

SUMMARY

Figure 1:
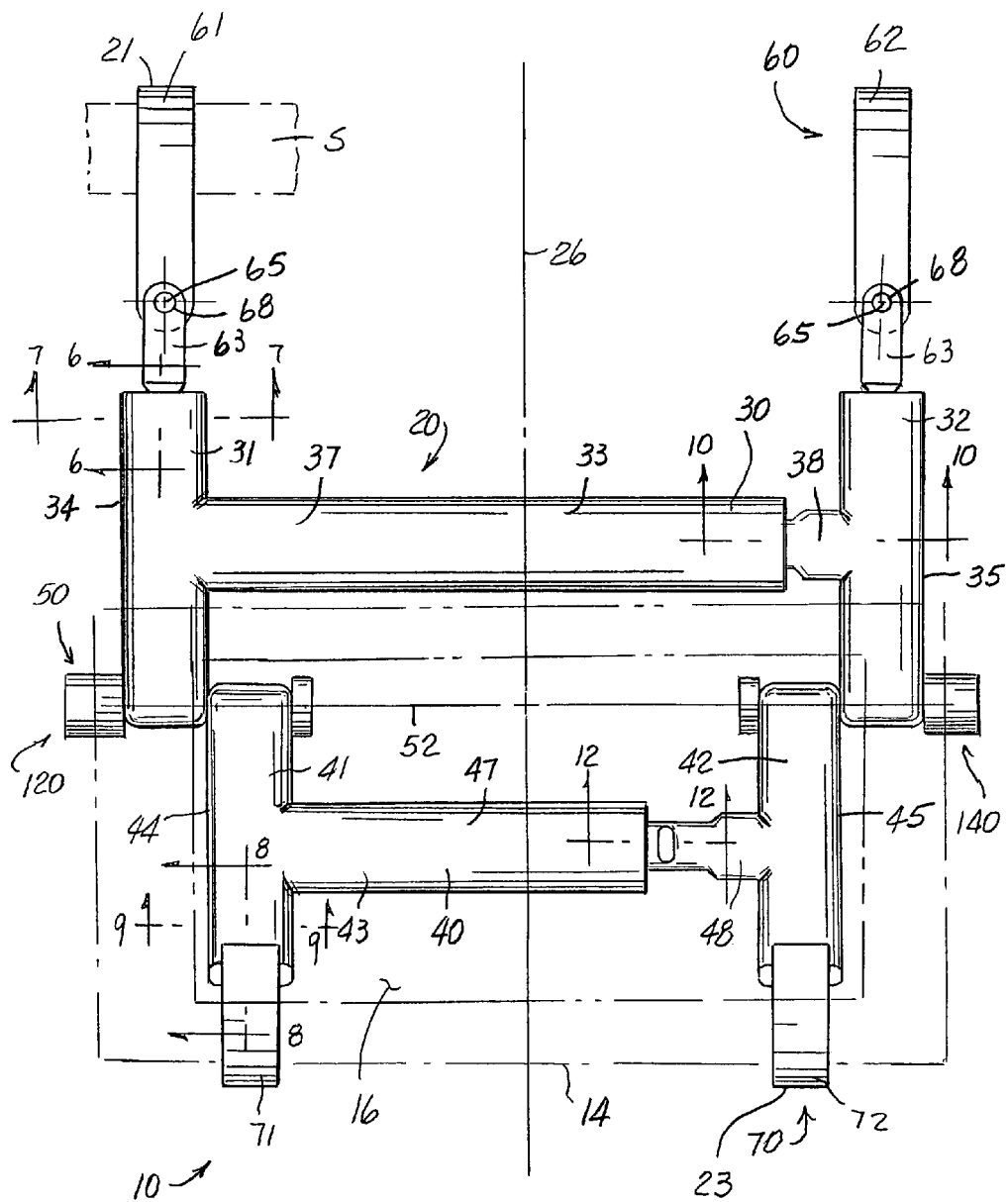
FIG. 1 is a front elevational view of one form of apparatus for suspending and releasably holding an electronic media device which embodies principals and teachings of this invention disclosure.

While this invention disclosure is susceptible of embodiment in multiple forms, there is shown in the drawings and will hereinafter be described preferred embodiments, with the understanding the present disclosure sets forth exemplifications of the disclosure which are not intended to limit the disclosure to the specific embodiments illustrated and described.

Referring now to the drawings, wherein like reference numerals indicate like parts throughout the several views, there is shown in FIG. 1 an apparatus, generally indicated by reference numeral 10, for suspending, releasably supporting and holding an electronic media device 14. As mentioned, the phrase or term "electronic media device" is meant to include any form of "i-Pad®", "Blackberry®", PDA, "Android" tablet, cellular telephone, or other suitable hand-held audio-visual device having a relative small screen 16 on which an electronic image can be displayed, programmed, played, and viewed.

Figure 2:
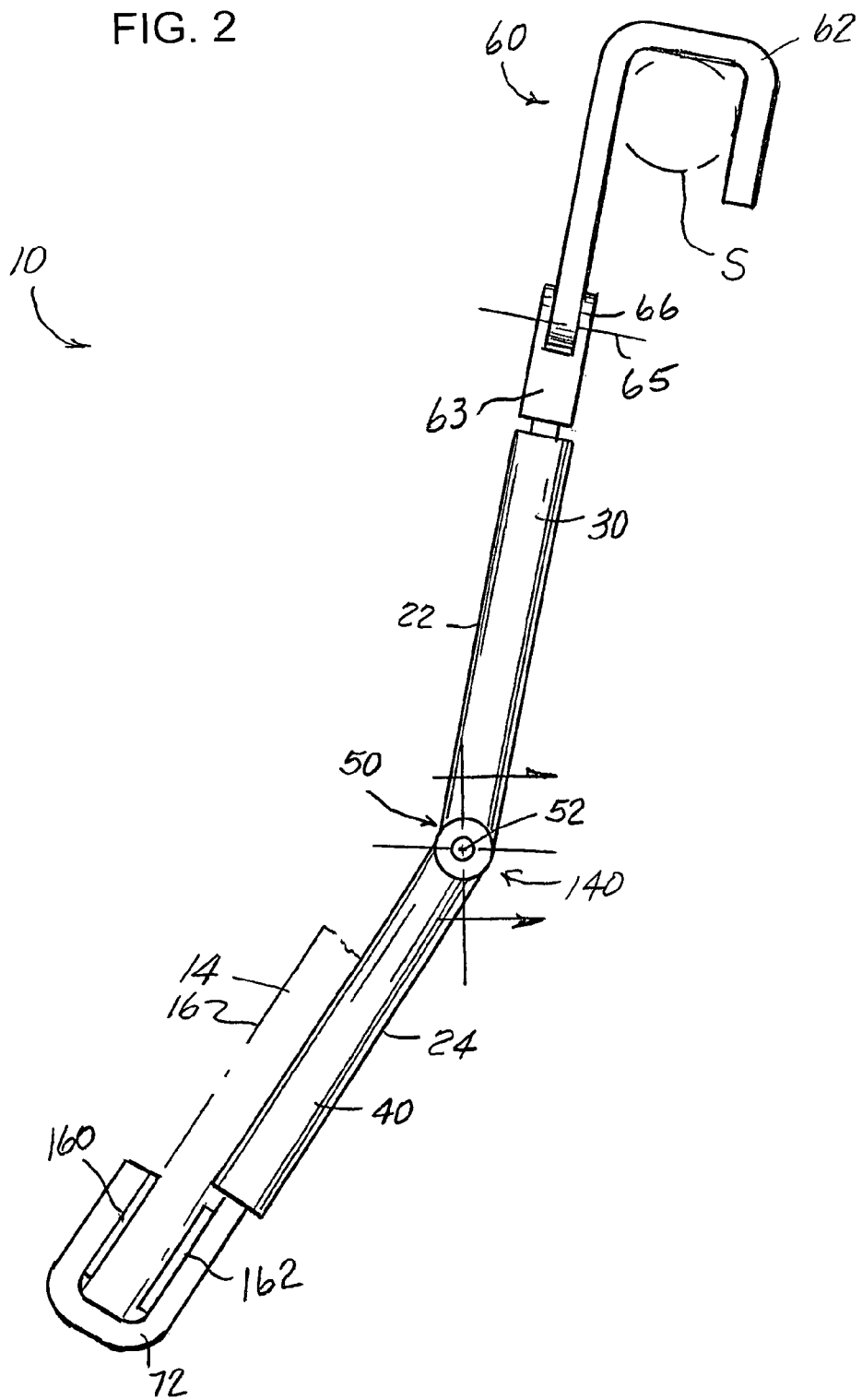
FIG. 2 is a side elevational view of the apparatus illustrated in FIG. 1.

In the embodiment illustrated in FIG. 1, apparatus 10 includes first and second ends 21 and 23, respectively, which can assume various positions relative to each other. Apparatus 10 includes a base 20 for suspending and supporting the electronic media device 14. In the embodiment illustrated in FIG. 1, base 10 has a first or upper region or segment 30 and a second lower region or segment 40. The first and second regions or segments 30 and 40, respectively of base 10 are joined to each other by hinge structure 50. In one condition or position of apparatus 10, the first and second segments 30 and 40, respectively, of base 10 extend longitudinally away from each other. Besides joining them to each other, hinge structure 50 allows for adjustable positioning and holding the upper and lower segments 30 and 40, respectively, about a pivot axis 52 and relative to each other to either enhance visualization of the generally flat screen 16 of the electric media device 14 or to allow the upper and lower segments 30 and 40, respectively to collapse upon each other whereby substantially reducing the operative length of the base 10 and thereby facilitating storage and transportation of apparatus 10 As shown in FIG. 2, base 10 further has a front 22 and a back 24.

In the embodiment illustrated by way of example in FIG. 1, and for reasons discussed in further detail below, a lower end or section of the upper base region 30 has a operative width which is slightly larger than an operative width of an upper end or section of the lower base region 40. Of course, and without detracting or departing from the spirit and scope of this invention disclosure, the upper end or section of the lower base region 40 can have an operative width which is slightly larger than the operative width of a lower section or region of the upper base region 40.

Base 20 defines a longitudinal axis 26 and, preferably, has a skeletal configuration whereby advantageously minimizing the overall weight of apparatus 10. In the embodiment illustrated by way of example in FIGS. 1 and 2, the upper region or segment 30 of base 20 includes a pair of generally parallel and generally identical elongated support arms 31 and 32; with the support arms 31, 32 being disposed to opposed lateral sides of the longitudinal axis 26 of base 20. In the illustrated embodiment, the support arms 31 and 32 are joined in a generally H-shaped pattern by a cross-piece or member 33 which operably holds the support arms 31 and 32 in generally parallel laterally spaced relation relative to each other. In the embodiment illustrated by way of example in FIG. 1, the lateral distance between outside surfaces 34 and 35 on the support arms 31 and 32, respectively, defines the operative width of the upper region or segment 30 of base 20.

In the embodiment illustrated for example in FIG. 1, the lower region or segment 40 of base 20 includes a pair of generally parallel and generally identical elongated support arms 41 and 42; with the support arms 41, 42 being disposed to opposed lateral sides of the longitudinal axis 26 of base 20. In the illustrated embodiment, the support arms 41 and 42 are joined in a generally H-shaped pattern by a cross-piece or member 43 which operably holds support arms 41 and 42 in generally parallel laterally spaced relation relative to each other. In the illustrated embodiment, the lateral distance between outside surfaces 44 and 45 on the support arms 41 and 42, respectively, defines the operative width of the lower region or segment 40 of base 20.

Apparatus 10 further includes structure 60 arranged toward end 21 thereof for suspending base 20 from a support, generally identified by S in FIG. 1. Preferably, the upper section or region of base 20 and the structure 60 for suspending the base from support S are configured relative to each other such that an operative length of the apparatus 10 can be adjusted when required or desired.

Apparatus 10 further includes structure 70 arranged toward end 23 thereof for releasably holding and stabilizing the electronic media device 14 with the generally flat screen 16 of the device 14 facing away from the front 22 of base 20 (FIG. 2). Preferably, the lower section or region 40 of base 20 and the structure 70 for releasably holding and stabilizing the electronic media device 14 are configured relative to each other such that an operative length of the apparatus 10 can be adjusted when required or desired.

In one form, the structure 60 arranged toward the upper end or section of the upper base segment 30 for suspending base 20 from a support S includes a pair of hook-shaped members 61 and 62 extending longitudinally away from the support arms 31 and 32, respectively, of base 20 and away from the back 24 of the base 20 (FIG. 2). Suffice it to say, members 61 and 62 are configured to allow the base to be suspended from support S.

Figure 3:
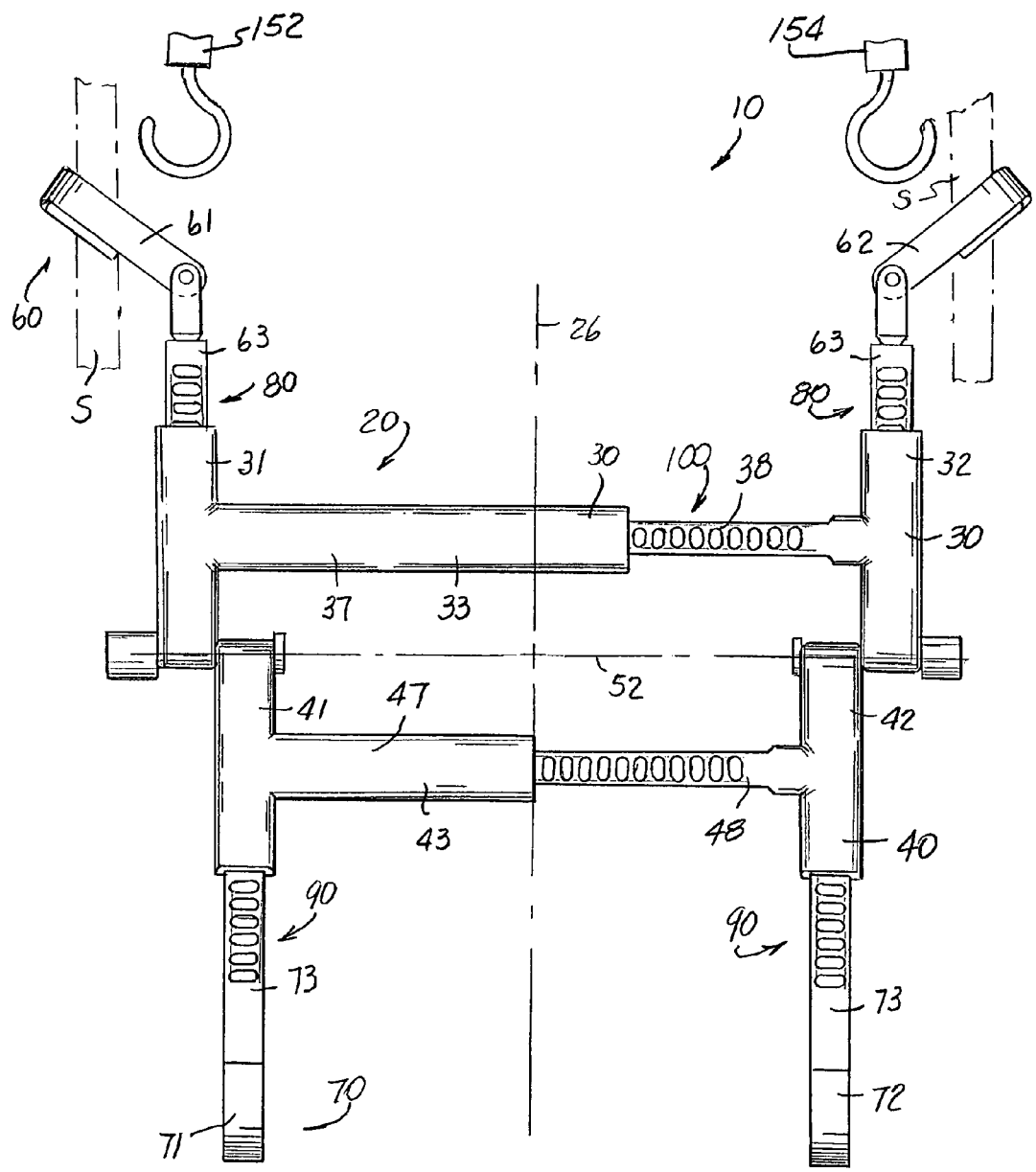
FIG. 3 is another front elevation view of the apparatus illustrated in FIG. 1 in an extended condition.

As mentioned, and as illustrated in comparing FIGS. 1 and 2 with either FIG. 3 or FIG. 4, the upper segment or region 30 of base 20 and the structure 60 for suspending the base from support S are configured relative to each other such that an operative length of the apparatus 10 can be lengthwise adjusted when required or desired. To effect such ends whereby significantly enhancing the versatility of apparatus 10, each hook-shaped member 61, 62 is preferably connected to the respective arm 31, 32 of base 20 so as to allow longitudinal movement of the structure 60 relative to base 20 whereby permitting the operable length of the apparatus 10 to be conditioned in either a longitudinally extended condition, illustrated in FIG. 3, or an intermediate condition, illustrated in FIGS. 1 and 2, or in a collapsed condition, illustrated in FIGS. 4 and 5 to significantly reduce the size of apparatus 10 (as compared to FIG. 3) whereby promoting compactness and storage capability of apparatus 10.

Figure 6:
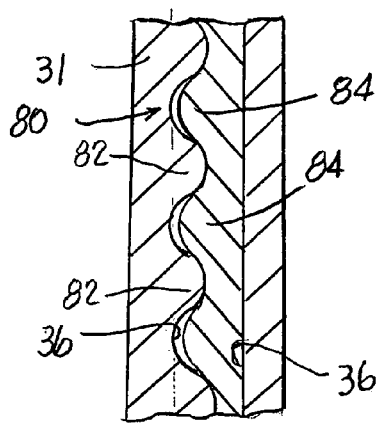
FIG. 6 is a sectional view taken along line 6-6 of FIG. 1.
Figure 7:
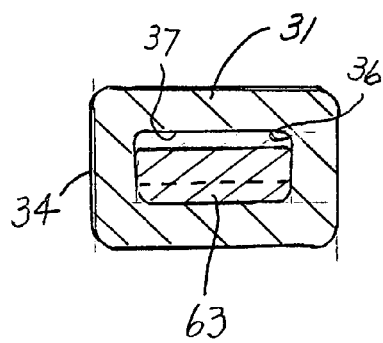
FIG. 7 is a sectional view taken along line 7-7 of FIG. 1.

In the embodiment illustrated in FIG. 3, each hook-shaped member 61, 62 includes a longitudinally elongated shank portion 63 which is telescopically received within an interior of a respective support arm 31, 32 on base 20. That is, and as shown in FIGS. 6 and 7, each support arm 31, 32 preferably defines a longitudinally elongated cavity or recess 36 having a closed marginal edge 37 along the length thereof. Preferably, a cross-section of such cavity 36 is substantially constant along the length thereof and is sized to slidably accommodate and longitudinally guide a significant length of the shank portion 63 extending from each hook-shaped member 61, 62.of structure 60. Although the arms 31, 32, along with the marginal edge 37 of each cavity 36 defined by each support arm 31, 32, and the shank portion 63 of the hook-shaped members 61, 62 are illustrated as having a generally rectangular cross-sectional configuration, it will be appreciated other cross sections, e.g., square, triangular and/or a circular, to name a few examples, would equally suffice.

The hook-shaped members 61, 62 are operably connected toward an end of the respective arm 31, 32 through cooperating instrumentalities, generally indicated by reference numeral 80, which permits structure 60 to be adjustably positioned relative to base 20 through minimal effort. Preferably, the cooperating instrumentalities 80 used to operably interconnect the hook-shaped member 61 to support arm 31 are substantially identical to the cooperating instrumentalities 80 used to operably interconnect hook-shaped member 62 to support arm 32. Accordingly, only the cooperating instrumentalities 80 used to operably interconnect support arm 31 and the hook-shaped member 61 will be discussed in detail.

In the embodiment illustrated in FIGS. 6 and 7, the cooperating instrumentalities 80 includes a series of longitudinally spaced projections 82 axially extending from a free end of and within the cavity 36 defined by support arm 31 and which project inward toward a center of arm 31. The projections 82 on arm 31 are specifically configured to mate with a complimentary series of longitudinally spaced projections 84 on a complimentary surface or side of the elongated shank portion 63 of hook-shaped member 61. It will be appreciated, the respective projections 82 and 84 on the support arm 31 and shank portion 63 of hook-shaped member 61 are configured relative to each other such that when a longitudinal force is directed against the hook-shaped member 61 and/or support arm 31, the cooperating instrumentalities 80 permit the hook-shaped member 61 and/or support arm 31 to be longitudinally moved and adjusted relative to each other whereby permitting extension/retraction of the operative length of apparatus 10 as required or desired. After an adjustable position or condition is selected for structure 60 relative to base 20, the cooperating instrumentalities 80 used to join and adjustably secure structure 60 relative to base 20 are designed and configured to furthermore maintain structure 60 in such adjusted position or condition relative to base 20 until otherwise changed through purposeful manipulation of structure 60 relative to base 20.

It should be appreciated, however, the cooperating instrumentalities 80 used to operably connect the hook-shaped members 61, 62 to the support arms 31, 32 of base 20 in a manner permitting structure 60 to be longitudinally adjusted relative to base 20 can be configured and designed other than that shown without detracting or departing from the spirit and scope of this invention disclosure. In another embodiment, an elongated slot on the shank portion 63 of each hook-shaped member 61, 62 of structure 60 along with the provision of a suitable fastener (not shown) on each support arm 31, 32 of base 20 could equally suffice for allowing adjustment of the operative length of apparatus 10 without detracting or departing from the spirit and scope of this invention disclosure.

In one form, the structure 70 arranged toward the lower end or section of the lower base segment 40 for releasably holding and stabilizing the electronic media device 14 (FIG. 1) includes a pair of hook-shaped members 71 and 72 extending longitudinally from the support arms 41 and 42, respectively, of base 20 and away from the front 22 of the base 20 (FIG. 2). Suffice it to say, members 71 and 72 are configured to snugly accommodate, hold and stabilize the electronic media device 14 (FIG. 1) relative to apparatus 20.

As mentioned, and as illustrated in comparing FIGS. 1 and 2 with either FIG. 3 or FIG. 4, the lower base section 40 and the structure 70 for releasably holding and stabilizing the electronic media device 14 (FIG. 1) are configured relative to each other such that an operative length of the apparatus 10 can be furthermore lengthwise adjusted when required or desired. To effect such ends whereby significantly enhancing the versatility of apparatus 10, each hook-shaped member 71, 72 is preferably connected to the respective support arms 41, 42 of base 20 so as to allow longitudinal movement of structure 70 relative to base 20 whereby permitting the operable length of the apparatus 10 to be conditioned in either a longitudinally extended condition, illustrated in FIG. 3, or an intermediate condition, illustrated in FIGS. 1 and 2, or in a collapsed condition, illustrated in FIGS. 4 and 5 to significantly reduce the size of apparatus 10 (as compared to FIG. 3) whereby promoting compactness and storage capability of apparatus 10.

Figure 8:
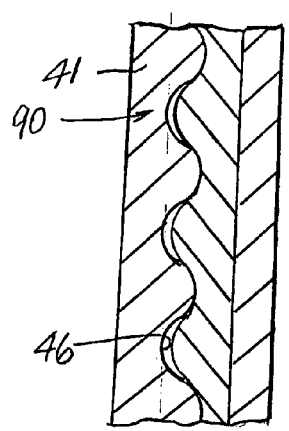
FIG. 8 is a sectional view taken along line 8-8 of FIG. 1.
Figure 9:
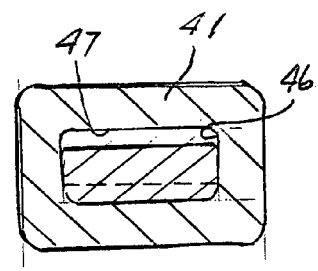
FIG. 9 is a sectional view taken along line 9-9 of FIG. 1.

In the embodiment shown in FIG. 3, each hook-shaped member 71, 72 includes a longitudinally elongated shank portion 73 which is telescopically received within the interior of a respective support arm 41, 42 on base 20. That is, and as shown in FIGS. 8 and 9, each support arm 41, 42 preferably defines a longitudinally elongated cavity or recess 46 having a closed marginal edge 47 along the length thereof. Preferably, a cross-section of such cavity 46 is substantially constant along the length thereof and is sized to slidably accommodate and longitudinally guide a significant length of the shank portion 73 extending from each hook-shaped member 71, 72.of structure 70. As mentioned above, and although the support arms 41, 42, along with the marginal edge 47 of cavity 46, and the shank portion 73 of each hook-shaped member 71, 72 are illustrated as having a generally rectangular cross-sectional configuration, it will be appreciated other cross sections, e.g, square, triangular and/or circular, to name a few examples, would equally suffice.

The shank portion 73 of each hook-shaped member 71, 72 is operably connected toward an end of the respective support arms 41, 42 through cooperating instrumentalities, generally indicated by reference numeral 90, which permit structure 70 to be adjustably positioned relative to base 20 through minimal effort. Preferably, the cooperating instrumentalities 90 used to operably interconnect hook-shaped member 71 to arm 41 are substantially identical to the cooperating instrumentalities 90 used to operably interconnect hook-shaped member 72 to arm 42 Preferably, the cooperating instrumentalities 90 permitting structure 70 to be adjustably positioned relative to base 20 are substantially similar to the cooperating instrumentalities 80 discussed above and, thus, no further details need be provided for a proper understanding of the function and structure thereof.

Like the cooperating instrumentalities 80 discussed above, however, it should be appreciated, the cooperating instrumentalities 90 used to operably connect the hook-shaped members 71, 72 to the respective support arms 41, 42 of base 20 in a manner permitting structure 70 to be longitudinally extended relative to base 20 can be configured and designed other than that shown without detracting or departing from the spirit and scope of this invention disclosure. For example, an elongated slot on the shank portion 73 of each hook-shaped member 71, 72 of structure 70 along with the provision of a suitable fastener (not shown) on each arm 41, 42 of base 20 would equally suffice for allowing adjustment of the operative length of apparatus 10 without detracting or departing from the spirit and scope of this invention disclosure.

As mentioned, and as illustrated in comparing FIG. 1 with FIG. 3, the upper segment or region 30 of base 20 and the structure 60 for suspending the base 20 from support S are configured such that an operative width of apparatus 10 can be laterally adjusted when required or desired. To effect such ends whereby significantly enhancing the versatility of apparatus 10, the cross-piece or member 33 interconnecting and maintaining the support arms 31, 32 in generally parallel relation relative to each other preferably includes a two-piece structure including a first laterally elongated member or piece 37 connected to and extending laterally from support arm 31 and a second laterally elongated member or piece 38 connected to an extending laterally from support arm 32.

Figure 10:
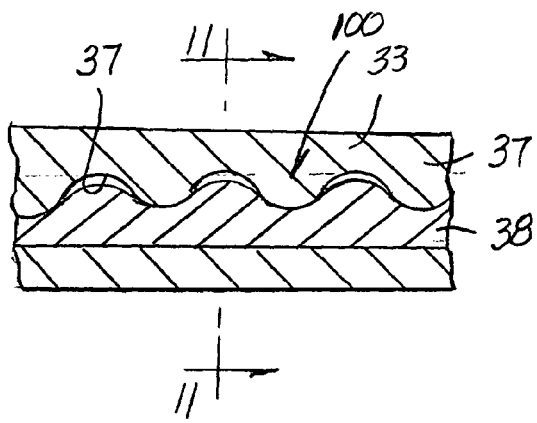
FIG. 10 is a sectional view taken along line 10-10 of FIG. 1.
Figure 11:
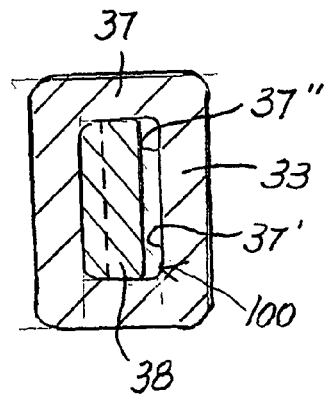
FIG. 11 is a sectional view taken along line 11-11 of FIG. 10.

In the illustrated embodiment, the elongated member or piece 38 is telescopically received within the interior of the elongated member or piece 37. That is, and as shown in FIGS. 10 and 11, the member or piece 37 of cross-piece 33 preferably defines an longitudinally elongated cavity or recess 37' having a closed marginal edge 37" along the length thereof. Preferably, a cross-section of the marginal edge 37" of such cavity 37' is substantially constant along the length thereof and is sized to slidably accommodate and laterally guide a significant length of the second piece 38 extending from support arm 32. Of course, the telescoping arrangement of the pieces or members 37 and 38 could be readily reversed without detracting or departing from the spirit and scope of this invention disclosure. Moreover, and although piece 37, along with the marginal edge 37" of the cavity 37' defined by piece 37, and the telescoping piece 38 are illustrated as having a generally rectangular cross-sectional configuration, it will be appreciated other cross sections, e.g, square, triangular and/or a circular, to name a few examples, would equally suffice.

The parts or pieces 37 and 38 comprising cross-piece 36 of base 20 are preferably maintained in a laterally adjusted position relative to each other by cooperating instrumentalities, generally indicated by reference numeral 100. Preferably, the cooperating instrumentalities 100 used to operably interconnect, maintain, and allow for lateral adjustment of the pieces 37 and 38 of cross-piece 36 relative to each other are substantially identical to the cooperating instrumentalities 80 used to operably interconnect hook-shaped member 61 to support arm 31 and thus no further detail needs to need be provided for a proper understanding of the function and structure thereof.

Like the cooperating instrumentalities 80 discussed above, however, it should be appreciated, the cooperating instrumentalities 100 used in conjunction with pieces 37 and 38 in a manner permitting the operable width of cross-piece 33 to be laterally adjusted can be configured and designed other than that shown without detracting or departing from the spirit and scope of this invention disclosure. For example, an elongated slot on the piece 37 along with the provision of a suitable fastener (not shown) on piece 38 of cross-piece 33 would equally suffice for allowing adjustment of the operative width of the upper segment 30 of base 20 of apparatus 10 without detracting or departing from the spirit and scope of this invention disclosure.

Similarly, the lower base segment 40 and the structure 70 for releasably holding and stabilizing the electronic media device 14 (FIG. 1) are configured such that an operative width of apparatus 10 can be laterally adjusted when required or desired whereby adding to the stability of the electronic media device 14 supported and carried thereby. To effect such ends whereby significantly enhancing the versatility of apparatus 10, the cross-piece or member 43 interconnecting and maintaining the support arms 41, 42 in generally parallel relation relative to each other preferably includes a two-piece structure including a first laterally elongated member or piece 47 connected to an extending laterally from support arm 41 and a second laterally elongated member or piece 48 connected to an extending laterally from support arm 42.

Figure 12:
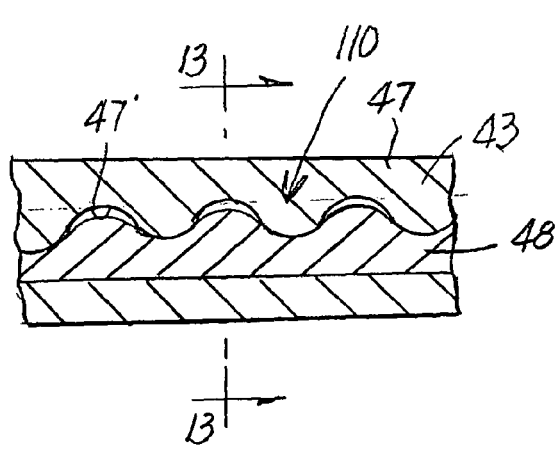
FIG. 12 is a sectional view taken along line 12-12 of FIG. 1.
Figure 13:
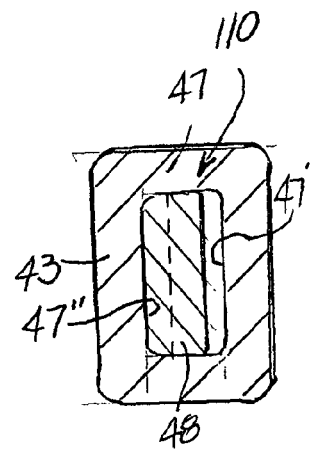
FIG. 13 is a sectional view taken along line 13-13 of FIG. 12.

In the illustrated embodiment, the elongated member or part 48 of cross-piece 43 is telescopically received within the interior of the elongated member or part 47 of cross-piece 43. As shown in FIGS. 12 and 13, the member or piece 47 of cross-piece 43 preferably defines a laterally elongated cavity or recess 47' having a closed marginal edge 47" (FIG. 13) along the length thereof. Preferably, a cross-section of such cavity 47' is substantially constant along the length thereof and is sized to slidably accommodate and laterally guide a significant length of the second piece 48 extending from support arm 42. Of course, the telescoping arrangement of the pieces or members 47 and 48 can be readily reversed without detracting or departing from the spirit and scope of this invention disclosure. Moreover, and although piece 47, along with the marginal edge 47" of the cavity 47' defined by piece 47, and the telescoping piece 48 are illustrated as having a generally rectangular cross-sectional configuration, it will be appreciated other cross sections, e.g, square, triangular and/or a circular, to name a few examples, would equally suffice.

The parts or pieces 47 and 48 comprising cross-piece 43 of base 20 are preferably maintained in a laterally adjusted position relative to each other by cooperating instrumentalities, generally indicated by reference numeral 110. Preferably, the cooperating instrumentalities 110 used to operably interconnect, maintain, and allow for lateral adjustment of the lower segment 40 of base 20 as through adjustment of pieces 47 and 48 of cross-piece 43 relative to each other are substantially identical to the cooperating instrumentalities 80 used to operably interconnect hook-shaped member 61 to arm 31.

Like the cooperating instrumentalities 80 discussed above, however, it should be appreciated, the cooperating instrumentalities 110 used in conjunction with piece 47 and 48 in a manner permitting the operable width of cross-piece 43 to be laterally adjusted can be configured and designed other than that shown without detracting or departing from the spirit and scope of this invention disclosure. For example, an elongated slot on the piece 47 along with the provision of a suitable fastener (not shown) on piece 48 of cross-piece 43 would equally suffice for allowing adjustment of the operative width of the lower section 40 of base 20 of apparatus 10 without detracting or departing from the spirit and scope of this invention disclosure.

Figure 14:
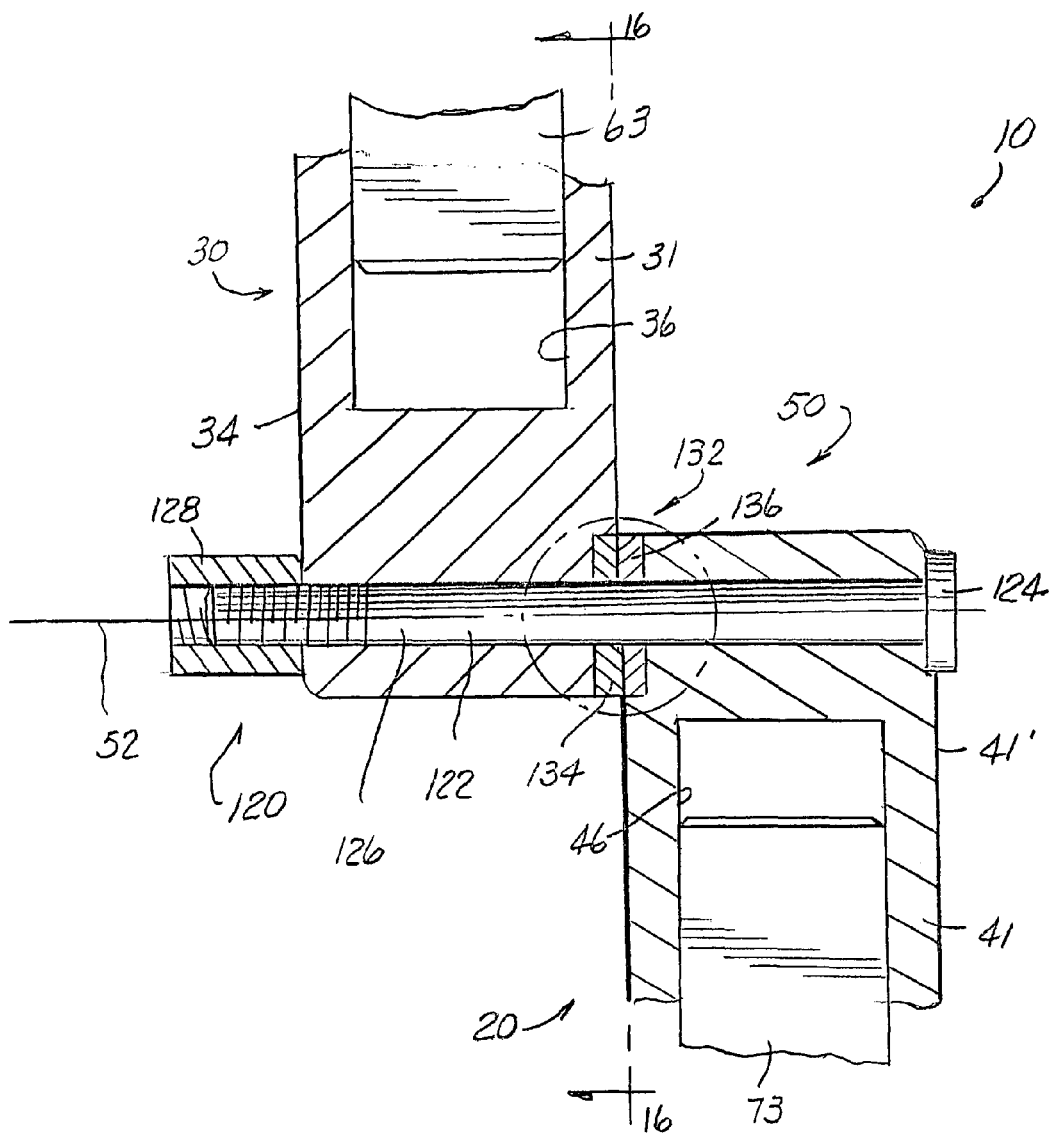
FIG. 14 is an enlarged partial sectional of one mechanism used in operable combination with this invention disclosure.

In the embodiment illustrated by way of example in FIG. 1, the hinge structure 50 joining the respective upper and lower segments 30 and 40 of base 20 to each other while allowing them to be rotated and collapsed upon each other to advantageously reduce the overall size of apparatus 10 to enhance storage an transportation preferably includes two independent and manually operated mechanisms 120 and 140. Mechanisms 120 and 140 are axially aligned relative to each other along axis 52. Preferably, mechanisms 120 and 140 are substantially identical and, thus, only a description of mechanism 120 will be provided As shown by way of example in FIG. 14, mechanism 120 includes a laterally elongated shaft 122 having an enlarged head portion 124 at one end thereof and a laterally elongated shank portion 126 extending from the head portion 124 and journalled by the conjoined ends of support arms 31 and 41. Notably, the shaft portion 126 is of sufficient length such that when the enlarged head portion 124 engages with an interior side 41' of arm 41, a lengthwise section of the shaft portion 126 extends axially through and laterally beyond the outer side of arm 34 of arm 31 and has a manually operated nut or handle portion 128 threadably engaged and adjustably arranged in operable association therewith. It should be apparent, the ability of mechanism 120 to allow for adjustably positioning and holding of the base segments 30 and 40 about pivot axis 52 is controlled by the clamping relationship of the head portion 124 and nut or handle portion 126 against opposed sides or surfaces of the support arms 31 and 41.

To furthermore enhance the ability of mechanism 120 to adjustably position and hold the base segments 30 and 40 in selected angular positions relative to each other and about the horizontal pivot axis 52 to either enhance visualization of the generally flat screen 16 of the electronic media device 14 or to releasably hold the base segments 30 and 40 in a collapsed position (FIGS. 4 and 5) whereby substantially reducing the operative length of the base 10, each mechanism 120 and 140 further includes a clutch mechanism 132. Preferably, the clutch mechanism 132 for each mechanism 120, 140 is substantially identical and, thus, only the clutch mechanism associated with mechanism 120 will be described in detail.

Figure 16:
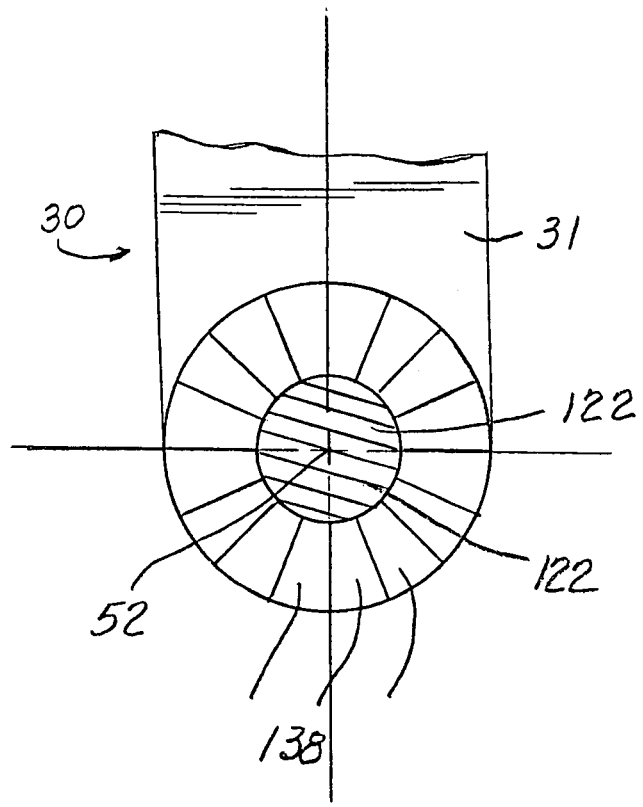
FIG. 16 is an enlarged side elevation view taken along line 16-16 of FIG. 14.
Figure 15:
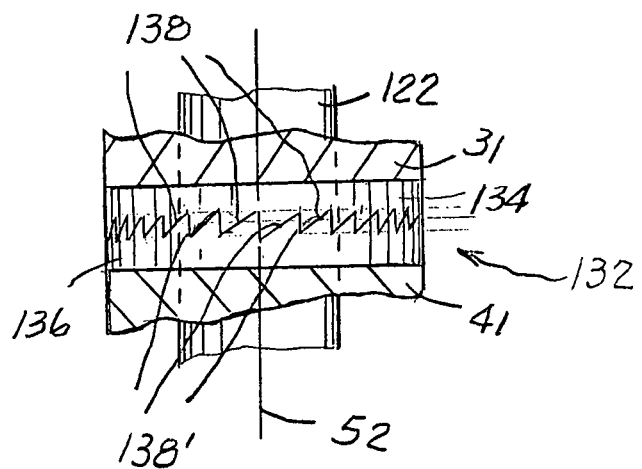
FIG. 15 is an enlarged fragmentary view of the area encircled in phantom lines in FIG. 14.

As illustrated in FIGS. 15 and 16, each clutch mechanism 132 preferably includes a pair of wedge-lock washers or serrated discs 134, 136 which are sold under the tradename "NORD-LOCK" washers or equivalent structure. In the illustrated embodiment, the wedge-lock washers 134, 136 are arranged in face-to-face confronting relation relative to each other and about the shaft portion 126 of the shaft 124 of mechanism 120. Washer 134 is affixed to an inner side of and rotates with support arm 31. Washer 134 can be fixed in any suitable manner to the inner side of support arm 41 as by welding, gluing, pinning or other suitable and well known means. Washer or disc 136 is affixed to an outer side of and rotates with support arm 41. Washer 136 can be fixed in any suitable manner to the outer side of arm 41 as by welding, gluing, pinning or other suitable and well known means.

As shown in FIGS. 15 and 16, one face of wedge-lock 134 is provided with a series of radially adjacent ramped surfaces 138. As shown in FIG. 15, the confronting face of the wedge-lock washer 136 is also provided with a like series of radially adjacent ramped surfaces 138' When the washers 134 and 136 are arranged in clamped relationship relative to each other, the radially adjacent, complementary engaging and ramped surfaces 138 and 138' on the washers 134 and 136, respectively, interengage relative to each other to inhibit rotational movement of the arms 31 and 41 relative to each other whereby releasably holding the upper and lower base segments 30 and 40 in adjusted position relative to each other. When the manually operated nut or handle portion 128 of either mechanism 120, 140 is loosened, however, the ramped surfaces 138 and 138' on the washers 134 and 136, respectively, are permitted to ratchet or otherwise rotate relative to each other whereby allowing relative angular and pivotal disposition of the support arms 31, 41 to be adjusted so as to allow the upper and lower base segments 30 and 40 to be rotated into an adjusted position relative to each other.

Returning to FIGS. 1 and 2, to allow a collapsed or storage position of the apparatus 10 to be minimized and for other advantageous purposes, the hook-shaped members 61 and 62 are preferably connected to each shank portion 63 in a manner permitting pivotal movement of the about a pivot axis 65. In the embodiment illustrated by way of example in FIG. 2, shank portion 63 is provided with a clevis-like configuration 66 and has one of the hook-shaped members 62, 64 arranged in operable combination therewith. A pivot pin 68 (FIG. 1) serves to articulately interconnect the hook-shaped member 61, 62 to the clevis 66 on the shank portion 63 of structure 60. This design allows the hook-shaped members 61, 62 to extend longitudinally from the base 20 as shown in FIGS. 1 and 2 or alternatively be pivoted to a position as shown in FIG. 5 wherein the operable length of apparatus 10 is shortened as compared to that illustrated in FIGS. 1 and 2. As shown in FIG. 3, the pivotal capability of the hook-shaped members 61, 62 facilitates alternate suspension of apparatus 10 from upright supports or posts S typically provided on a head rest of an automobile.

As shown in FIG. 3, the structure 60 arranged toward the upper end of the upper segment 30 of base 20 for suspending the base 20 can further include straps 152 and 154 extendable from the upper end of the upper segment of base 20. Such straps 152, 154 would allow apparatus 10 to be suspended from a support disposed remote from apparatus 10.

Additionally, Applicant recognizes the electronic media device 14 suspended and releasably held by apparatus 10 could be subjected to vibrations and the like when suspended from a support S (FIG. 1). Accordingly, and in an effort to reduce damage to the electronic media device 14 when suspended, and as shown in FIGS. 2 and 5, apparatus 10 can further one or more elastomeric energy absorbing pads 160 and 162 associated with structure 70. More specifically, one or more elastomeric energy absorbing pads 160, 162 are secured to an interior side or surface of each hook-shaped member 71, 72 comprising, in a preferred embodiment, structure 70. Preferably, a suitable adhesive on one side of each pad 160, 162 secures the pads 160, 162 in place. Moreover, and if required, the pads 160, 162 can be stacked upon each other if required and or desired to control the size of the opening on structure 70 used to releasably hold and stabilize the electronic media device 14.

Figure 17:
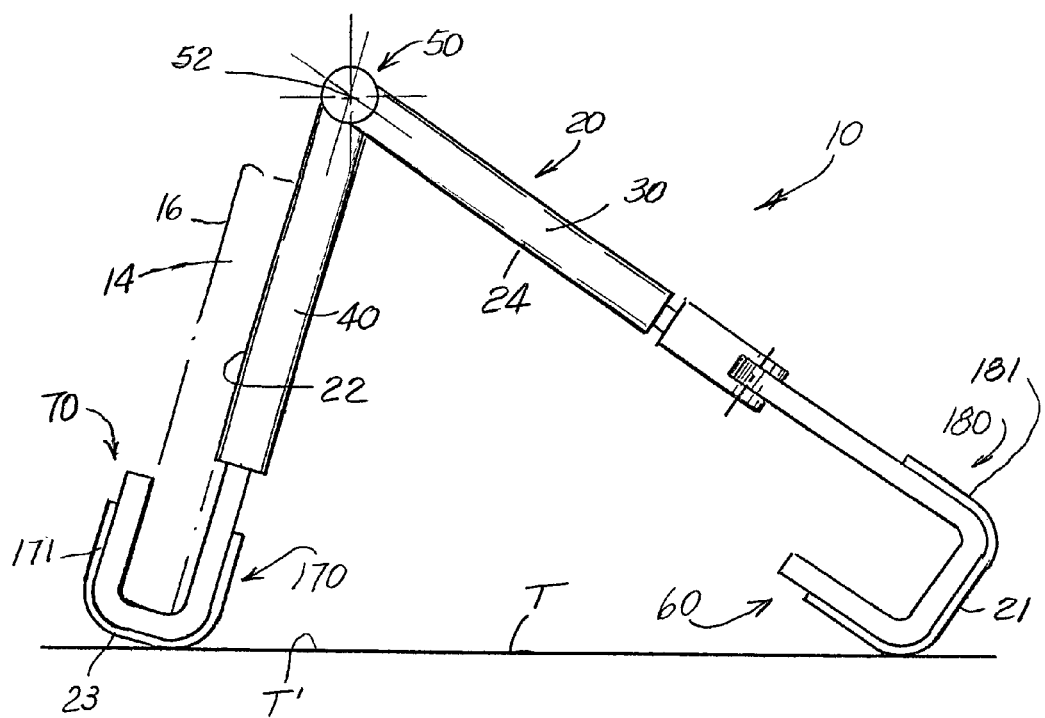
FIG. 17 is an enlarged side elevational view of an alternative embodiment of the apparatus for suspending and releasably holding an electronic media device which embodies principals and teachings of this invention disclosure.

FIG. 17 depicts an alternative configuration for apparatus 10. In FIG. 17, the upper and lower segments 30 and 40, respectively, of base 20 are shown in an adjusted angular position whereby permitting apparatus 10 to freely stand on a table, desk or other suitable form of generally horizontal support T so as to receive and hold the electronic media device 14 (depicted in dash lines in FIG. 17) in a position to permit viewing thereof.

The base 20 of the apparatus shown in FIG. 17 has a first end 21, a second end 23, along with a first segment 30, a second segment 40, a front 22, and a back 24. As mentioned and discussed in detail above, apparatus 10 further includes structure 70 arranged toward one end thereof for receiving, releasably holding and stabilizing the electronic media device with the generally flat screen 16 of the device 14 facing away from the front 22 of base 20.

Apparatus 10 further includes structure 50 disposed between and joining the first and second base segments 30 and 40, respectively. As discussed above, structure 50 is designed to permit the first base segment 30 to rotate relative to the second base segment 40 about a generally horizontal axis 52. As discussed above, structure 50 furthermore serves to releasably hold the first and second base segments 30 and 40, respectively, in selected angular relation relative to each other.

To reduce the likelihood of apparatus 10 sliding or slipping on the support surface T, this embodiment of apparatus 10 further includes a first covering 170 extending along and about an exterior region of the structure 70 arranged toward the second end 23 of apparatus 10. Covering 170 is designed to grip the generally horizontal surface T' of the support T on which apparatus 10 is supported with base segments 30 and 40 disposed in angular relation relative to each other and with the first and second ends 21 and 23 of apparatus 10 being disposed to opposed sides of the generally horizontal axis 52.

In the illustrated embodiment, covering 170 is shown as an elastomeric or rubber-like coating applied to an exterior of the structure 70 used to receive, releasably hold and stabilize the electronic media device. Alternatively, and without detracting or departing from the spirit and scope of this invention disclosure, covering 170 can also be comprised of one or more elastomeric or rubber-like pads 171 associated with structure 70. More specifically, and in the illustrated embodiment, one or more elastomeric pads 171 are secured to an exterior side or surface of each hook-shaped member comprising structure 70. Preferably, a suitable adhesive on one side of each pad 171 can be used to secure the pads 171 in place.

To still furthermore reduce the likelihood of apparatus 10 sliding or slipping on the support surface T' of support T, the embodiment of apparatus 10 illustrated in FIG. 17 includes a second covering 180 extending about and along an exterior region of the first end 21 of apparatus 40 configured to engage with the generally horizontal support surface T' of support T. Covering 180 is designed to grip the generally horizontal surface T' of the support T on which apparatus 10 is supported with base segments 30 and 40 disposed in angular relation relative to each other and with the first and second ends 21 and 23 of apparatus 20 being disposed to opposed sides of the generally horizontal axis 52.

In the illustrated embodiment, covering 180 is shown as an elastomeric or rubber-like coating applied about and along an exterior of the structure 60 for hanging or otherwise suspending base 20 from support S. Of course, if structure 60 is designed other than with hooks 61, 62 (as discussed above), it will be understood, however, covering 180 can be provided about and along an exterior of such alternative structure at the second end 21 of apparatus 10 without departing or detracting from the spirit and scope Alternatively, and again without detracting or departing from the spirit and scope of this invention disclosure, covering 180 can be comprised of one or more elastomeric or rubber-like pads 181 provided toward the second end 21 of apparatus 10. In the illustrated embodiment, one or more elastomeric pads 181 are secured to an exterior side or surface of each hook-shaped member 62, 64 comprising structure 60. Preferably, a suitable adhesive on one side of each pad 181 can be used to secure the pads 181 in place.

Figure 18:
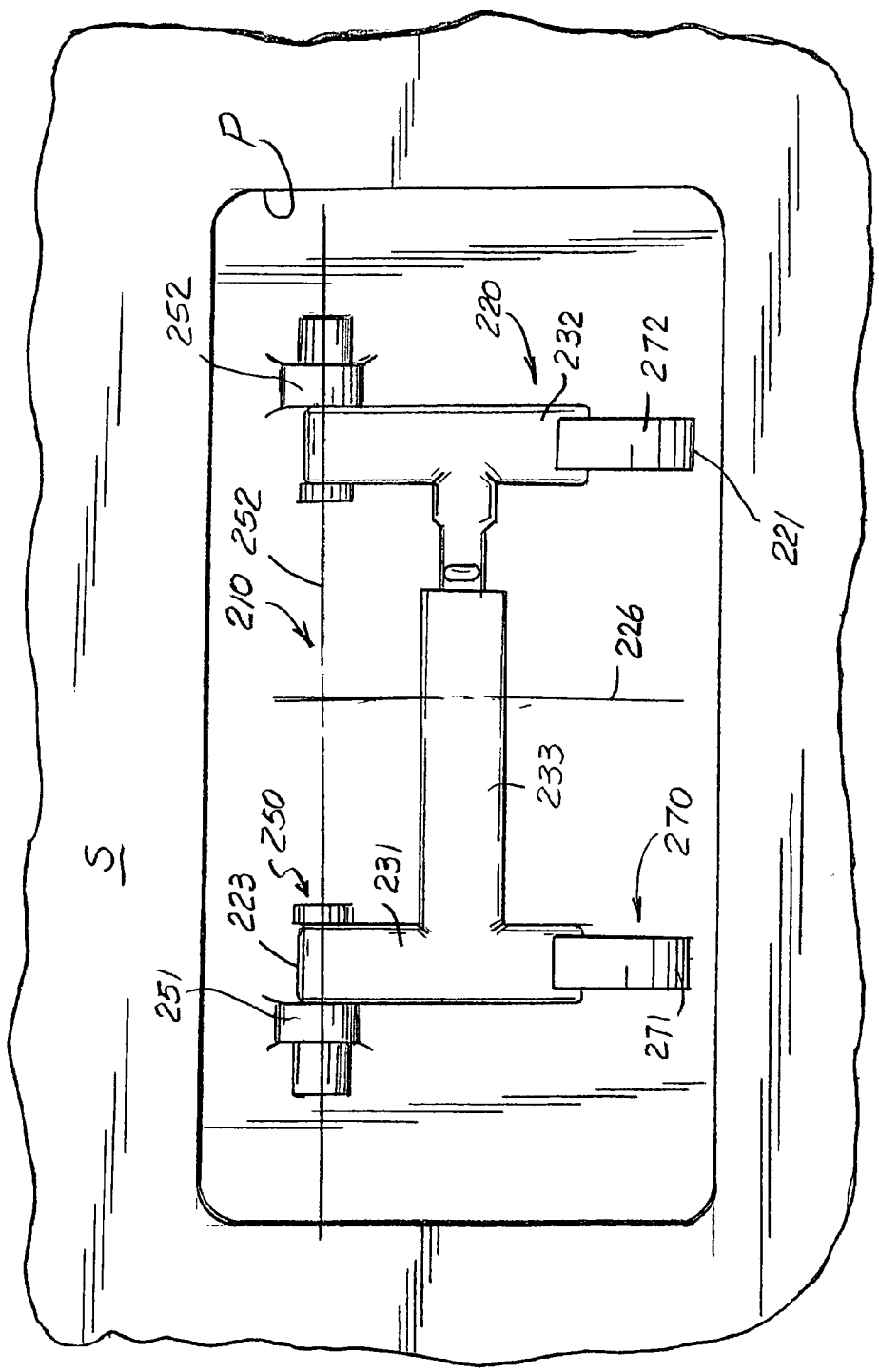
FIG. 18 is a front elevational view of another embodiment of the apparatus for suspending and releasably holding an electronic media device and which is mounted on and in operable combination with a generally vertical support.

FIG. 18 shows yet another alternative configuration of an apparatus for suspending, releasably supporting and holding an electronic media device 14. This alternative form of apparatus for suspending, releasably supporting and holding an electronic media device is designated generally by reference numeral 210. The elements of this alternative apparatus that are functionally analogous to those components or elements discussed above regarding apparatus 10 are designated by reference numerals identical to those listed above regarding apparatus 10 with the exception this embodiment uses reference numerals in the 200 series.

In the embodiment illustrated in FIG. 18, apparatus 210 includes first and second ends 221 and 223, respectively. Apparatus 210 includes an elongated base 220 for suspending and supporting the electronic media device. In the embodiment illustrated in FIG. 18, apparatus 210 is pivotally connected or joined, toward a second end 223 thereof, to a generally vertical support S by hinge structure 250. In the form shown in FIGS. 18 through 21, support S is in the form of a retractable tray or table which forms part of a rear of an airplane seat, bus seat, or the like. In one condition or position of apparatus 10, apparatus 210 extends generally parallel to support S. Besides joining apparatus 210 to the support S, hinge structure 250 allows for adjustable positioning and holding of apparatus 210 about a pivot axis 252 to either enhance visualization of the screen of an electric media device or to facilitate storage of apparatus 210. As shown in FIGS. 20 and 21, base 220 further has a front 222 and a back 224. In a most preferred form, the support S defines a recessed pocket P which, when apparatus 210 is not in use, is sized to at least partially accommodate apparatus 210 in a recessed position (FIG. 19).

Base 220 defines a longitudinal axis 226 and, preferably, has a skeletal configuration whereby advantageously minimizing the overall weight of apparatus 210. In the embodiment illustrated by way of example in FIG. 18, base 220 includes a pair of generally parallel and generally identical and elongated support arms 231 and 232; with the support arms 231, 232 being disposed to opposed lateral sides of the longitudinal axis 226 of base 220. In the illustrated embodiment, the support arms 231 and 232 are joined in a generally H-shaped pattern by a cross-piece or member 233 which operably holds the support arms 231 and 232 in generally parallel laterally spaced relation relative to each other.

Apparatus 210 further includes structure 270 arranged toward end 221 thereof for releasably holding and stabilizing the electronic media device; with the generally flat screen of the device facing away from the front 222 of base 220. Preferably, base 220 and the structure 270 for releasably holding and stabilizing the electronic media device are configured relative to each other such that an operative length of the apparatus 210 can be lengthwise adjusted when required or desired.

Preferably, the structure 270 arranged toward the end 221 of apparatus 210 for releasably holding and stabilizing the electronic media device includes a pair of hook-shaped members 271 and 272 extending longitudinally from the support arms 231 and 232 respectively, of base 220 and away from the front 222 of the base 220. Suffice it to say, members 271 and 272 are configured to snugly accommodate, hold and stabilize an electronic media device relative to apparatus 210.

As mentioned, and as illustrated in comparing FIG. 20 with FIG. 21, the base 220 and the structure 270 for releasably holding and stabilizing an electronic media device are configured relative to each other such that an operative length of the apparatus 210 can be lengthwise adjusted when required or desired. To effect such ends whereby significantly enhancing the versatility of apparatus 210, structure 270 is preferably connected to the base 220 so as to allow longitudinal movement of structure 270 relative to base 220 whereby permitting the operable length of the apparatus 210 to be conditioned in either a longitudinally extended condition, illustrated in FIG. 21 or in a collapsed condition, illustrated in FIGS. 18 and 19 to significantly reduce the size of apparatus 210 whereby promoting compactness and storage capability of apparatus 210.

When structure 270 is designed with hook-shaped members 271, 272, as mentioned above and incorporated by reference herein, each hook-shaped member 271, 272 includes a longitudinally elongated shank portion 273 which is telescopically received within an interior of a respective support arm 231, 232 on base 220. The shank portion 273 of each hook-shaped member 271, 272 is operably connected toward an end of the respective support arms 231, 232 through cooperating instrumentalities, generally indicated by reference numeral 290, which permits structure 270 to be adjustably positioned with minimal effort relative to base 220, as seen in comparing FIGS. 20 and 21.

Preferably, the cooperating instrumentalities 290 used to operably interconnect structure 270 to base 220 are substantially identical to the cooperating instrumentalities 90 used to operably interconnect structure 70 to base 20, as mentioned above and incorporated herein by reference. Since the cooperating instrumentalities 290 permitting structure 270 to be adjustably positioned relative to base 220 are substantially similar to that discussed above, no further details need be provided for a proper understanding of the function and structure thereof.

Like the cooperating instrumentalities 290 discussed above, however, it will be appreciated, the cooperating instrumentalities 290 used to operably connect structure 220 to the base 20 in a manner permitting structure 270 to be longitudinally extended relative to base 220 can be configured and designed other than that shown without detracting or departing from the spirit and scope of this invention disclosure. For example, and when structure 270 includes hook-shaped members 271, 272 as shown in FIG. 18, an elongated slot on the shank portion 273 of each hook-shaped member 271, 272 of structure 270 along with the provision of a suitable fastener (not shown) on each arm 231, 2322 of base 220 would equally suffice for allowing adjustment of the operative length of apparatus 210 without detracting or departing from the spirit and scope of this invention disclosure.

In the embodiment illustrated in FIG. 18, the hinge structure 250 joining the base 220 to support S also allows for rotation of apparatus 210 about pivot axis 252, to enhance storage and/or visibility of an electronic media device. In this embodiment, hinge structure 250 is substantially similar to hinge structure 50 discussed above. In the embodiment illustrated in FIG. 18, however, support S is provided with a pair of laterally aligned and spaced free-ended lugs 251 and 252 extending forwardly from the pocket P and which capture or otherwise embrace the free upper ends of support arms 231 and 232 therebetween. Although not specifically illustrated in FIG. 18, it will be understood that hinge structure 250 preferably includes separately operable mechanisms, similar to mechanisms 120 and 140 discussed above, for maintaining and holding the arms 231 and 232 of base 220 in an adjusted angular disposition relative to the support S as a result of clamping each support arm 231, 232 of base 220 against a respective lug 251, 252. Of course, releasing the respective mechanism forming part of hinge structure 250 will release each arm 231, 232 relative its respective lug 251, 252 whereby permitting base 220 to be moved to a desired angular position relative to support S as seen in comparing FIGS. 19 and 21.

From the foregoing, it will be observed that numerous modifications and variations can be made and effected without departing or detracting from the true spirit and novel concept of this invention disclosure. Moreover, it will be appreciated, the present disclosure is intended to set forth exemplifications which are not intended to limit the disclosure to the specific embodiments illustrated. Rather, this disclosure is intended to cover by the appended claims all such modifications and variations as fall within the spirit and scope of the claims.

What is claimed is:

1. An apparatus for releasably holding an electronic media device having a generally flat screen on which an image can be electronically displayed, said apparatus comprising:

an elongated base for supporting said electronic media device, said base having an upper region, a lower region, a front and a back, wherein the upper region of said base comprises a first pair of elongated and laterally spaced support arms, and wherein the lower region of said base comprises a second pair of elongated and laterally spaced support arms, with the pairs of elongated and laterally spaced support arms comprising the upper and lower regions of said base being interconnected to each other by hinge structure, and wherein said base further includes upper and lower cross-pieces for maintaining the respective pairs of elongated and laterally spaced support arms comprising said upper and lower regions of said base in generally parallel spaced relation relative to each other, and wherein said upper and lower cross-pieces are each structured so as to permit an operational width of the base to be adjusted by moving said pairs of elongated and laterally spaced support arms comprising the upper and lower regions of said base relative to each other;

structure arranged toward an upper end of the upper region of said base for suspending said base from a support;

structure arranged toward a lower end of the lower region of said base for receiving, releasably holding and stabilizing said electronic media device with the generally flat screen of said device facing away from the front of said base; and structure disposed between the upper region and the lower region of said base for adjustably positioning and releasably holding the lower and upper regions of said base about a generally horizontal pivot axis and relative to each other so as to enhance visualization of the generally flat screen of said electronic media device, with said structure for adjustably positioning and releasably holding the lower and upper regions of said base including a clutch assembly comprising two independent and manually operable mechanisms arranged along and about said pivot axis, with each mechanism including a pair of wedge-lock washers arranged in face-to-face confronting relation relative to each other.

2. The apparatus for releasably holding an electronic media device according to claim 1, wherein said structure arranged toward the upper region of said base for suspending said base from a support includes generally hook-shaped members extending away from the back of said base.

3. The apparatus for releasably holding an electronic media device according to claim 2, wherein said hook-shaped members of said structure arranged toward the upper region of said base for suspending said base from a support are pivotally movable relative to said base.

4. The apparatus for releasably holding an electronic media device according to claim 1, further including straps extendable from the upper region of said base for suspending said base from said support.

5. The apparatus for releasably holding an electronic media device according to claim 1, wherein said structure arranged toward the lower region of said base for receiving, releasably holding and stabilizing said electronic media device with the generally flat screen of said device facing away from the front of said base includes generally hook-shaped members extending away from the front of said base.

6. An apparatus for releasably holding an electronic media device having a generally flat screen on which an image can be electronically displayed, said apparatus comprising:

an elongated base for supporting said electronic media device, said base having an upper region, a lower region, a front and a back, and wherein said base allows an operational width to be adjusted by at least one cross-piece on either of the upper region or lower region;

structure arranged toward an upper end of the upper region of said base for suspending said base from a support, and wherein the upper region of said base and said structure for suspending said base from a support are configured relative to each other such that an operative length of the base of said apparatus can be lengthwise adjusted;

structure arranged toward a lower end of the lower region of said base for receiving, releasably holding and stabilizing said electronic media device with the generally flat screen of said device facing away from the front of said base; and structure disposed between the upper region and the lower region of said base for adjustably positioning and releasably holding the lower and upper regions of said base about a generally horizontal pivot axis and relative to each other so as to enhance visualization of the generally flat screen of said electronic media device, with said structure for adjustably Positioning and releasably holding the lower and upper regions of said base including a clutch assembly comprising two independent and manually operable mechanisms arranged along and about said pivot axis, with each mechanism including a pair of wedge-lock washers arranged in face-to-face confronting relation relative to each other.

7. An apparatus for releasably holding an electronic media device having a generally flat screen on which an image can be electronically displayed, said apparatus comprising:

an elongated base for supporting said electronic media device, said base having an upper region, a lower region, a front and a back;

structure arranged toward an upper end of the upper region of said base for suspending said base from a support;

structure arranged toward a lower end of the lower region of said base for receiving, releasably holding and stabilizing said electronic media device with the generally flat screen of said device facing away from the front of said base, and wherein the lower region of said base and said structure for receiving, releasably holding and stabilizing said electronic media device are configured relative to each other such that an operative length of the base of said apparatus can be lengthwise adjusted;

structure disposed between the upper region and the lower region of said base for adjustably positioning and releasably holding the lower and upper regions of said base about a generally horizontal pivot axis and relative to each other so as to enhance visualization of the generally flat screen of said electronic media device, with said structure for adjustably positioning and releasably holding the lower and upper regions of said base including a clutch assembly comprising two independent and manually operable mechanisms arranged along and about said pivot axis, with each mechanism including a pair of wedge-lock washers arranged in face-to-face confronting relation relative to each other.

8. An apparatus for releasably holding an electronic media device having a generally flat screen on which an image can be electronically displayed, said apparatus comprising:

an elongated base for supporting said electronic media device, said base having an upper region, a lower region, a front and a back, wherein the upper region of said base comprises a first pair of elongated and laterally spaced support arms, and wherein the lower region of said base comprises a second pair of elongated and laterally spaced support arms, with the pairs of elongated and laterally spaced support arms comprising the upper and lower regions of said base being interconnected to each other by hinge structure, and wherein said base further includes upper and lower cross-pieces for maintaining the respective pairs of elongated and laterally spaced support arms comprising said upper and lower regions of said base in generally parallel spaced relation relative to each other, and wherein said upper and lower cross-pieces are each structured so as to permit an operational width of the base to be adjusted by moving said pairs of elongated and laterally spaced support arms comprising the upper and lower regions of said base relative to each other;

structure arranged toward the upper region of said base for suspending said base from a support during use;

structure arranged toward the lower region of said base for receiving, releasably holding and stabilizing said electronic media device during use, with the generally flat screen of said device facing away from the front of said base; and wherein at least one of the upper region of said base and said structure for suspending said base from said support during use and the lower region of said base and said structure for receiving, releasably holding and stabilizing said electronic media device during use are configured relative to each other such that an operative length of said base of said apparatus can be lengthwise adjusted; and with said base further including structure disposed between the upper region and lower region of said base for adjustably positioning and releasably holding the lower and upper regions of said base relative to each other and about a generally horizontal axis to enhance visualization of the generally flat screen of said electronic media device, with said structure for adjustably positioning and releasably holding the lower and upper regions of said base relative to each other including a clutch mechanism arranged along and about said generally horizontal axis and comprising at least two wedge-lock washers arranged in face-to-face confronting relation relative to each other.

9. The apparatus for releasably holding an electronic media device according to claim 8, wherein said structure arranged toward the upper region of said base for suspending said base from a support includes generally hook-shaped members extending away from the back of said base for allowing said apparatus to be suspended from said support.

10. The apparatus for releasably holding an electronic media device according to claim 9, wherein said hook-shaped members of said structure arranged toward the upper region of said base for suspending said base from a support are pivotally movable relative to said base.

11. The apparatus for releasably holding an electronic media device according to claim 8, further including straps extendable from the upper region of said base for suspending said base from said support.

12. An apparatus for releasably holding an electronic media device having a generally flat screen on which an image can be electronically displayed, said apparatus comprising:

an elongated base including a first segment and a second segment joined to said first segment by hinge structure to allow said second segment to be adjustably positioned and held between a first position, with the first segment of said base including first and second elongated and laterally spaced support arms, wherein said second segment extends at an angle relative to said first segment, and a second position wherein said first and second segments are collapsed relative to each other to substantially reduce an operative length of said base whereby facilitating storage and transportation of said base, with the first segment of said base including first and second elongated and laterally spaced arms, with the second segment of said base including third and fourth elongated and laterally spaced support arms, and wherein said base allows an operational width to be adjusted by at least one crosspiece on either of the first segment or second segment;

with said base including structure extending in a first direction away from and arranged toward an upper region of said first segment for suspending said base from a support, and wherein the first and second support arms of the first segment of said base along with the structure for suspending said base from a support are configured relative to each other such that an operative length of the base of said apparatus can be lengthwise adjusted;

and with said base further including structure extending in a direction opposed to said first direction and arranged toward a lower region of the second segment of said base for receiving, releasably holding and stabilizing said electronic media device with the generally flat screen of said device facing away from a front of said base; and a clutch mechanism operable in combination with said hinge structure for releasably maintaining said second segment in position relative to said first segment, with said clutch mechanism being arranged along and about a generally horizontal axis defined by said hinge structure, with said clutch mechanism comprising at least two wedge-lock washers arranged in face-to-face confronting relation relative to each other.

13. The apparatus for releasably holding an electronic media device according to claim 12, wherein the third and fourth support arms of the second segment of said base along with said structure for receiving, releasably holding and stabilizing said electronic are configured relative to each other such that an operative length of the base of said apparatus can be lengthwise adjusted.

14. The apparatus for releasably holding an electronic media device according to claim 12, wherein said structure for suspending said base from said support includes generally hook-spaced members extending from said base for allowing said apparatus to be suspended from said support.

15. The apparatus for releasably holding an electronic media device according to claim 14, wherein said hook-shaped members of said structure for suspending said base from the support are pivotally movable relative to said base.

16. An apparatus for releasably holding an electronic media device having a generally flat screen on which an image can be electronically displayed, said apparatus having a first end and a second end, and with said apparatus comprising:

an elongated base for supporting said electronic media device in a position to permit viewing thereof, with said base having a first segment, a second segment, a front and a back;

structure arranged toward the first end of said apparatus and in operable combination with the first segment of said base for suspending said base from a support, with said structure arranged toward the first end of said apparatus and in operable combination with the first segment of said base for suspending said base from a support said base being configured relative to each other so as to permit an operable length of said base to be lengthwise adjusted;

structure arranged toward the second end of said apparatus and in operable combination with the second segment of said base for receiving, releasably holding and stabilizing said electronic media device with the generally flat screen of said device facing away from the front of said base; and structure disposed between and joining said first and second segments of said base and for permitting the first segment of said base to rotate relative to said second segment of said base about a generally horizontal axis, with said structure for joining said first and second segments of said base including a clutch assembly for releasably holding said first and second segments of said base in a selected angular relation relative to each other, and wherein said clutch assembly is arranged along and about said generally horizontal axis and comprises at least two wedge-lock washers arranged in face-to-face confronting relation relative to each other, with one wedge-lock washer being operably associated with the first segment of said base and a second wedge-lock washer being operably associated with the second segment of said base;

with the structure arranged toward the first end of said apparatus having a first covering on an exterior region thereof for enhancing the ability of the structure arranged toward the first end of said apparatus to grip a surface on which said apparatus is supported, with the first and second ends of said apparatus being disposed to opposed sides of the generally horizontal axis when said base is suspended from said support; and with the structure arranged toward the second end of said apparatus having a second exterior covering for enhancing the ability of the apparatus to grip the surface on which said apparatus is supported, with the first and second ends of said apparatus being disposed to opposed sides of the generally horizontal axis when said base is suspended from said support.

17. The apparatus for releasably holding an electronic media device according to claim 16, wherein the second segment of said base and said structure for receiving, releasably holding and stabilizing said electronic media device being configured relative to each other such that the operative length of the base of said apparatus can be lengthwise adjusted.

18. The apparatus for releasably holding an electronic media device according to claim 16, wherein said structure arranged toward the first end of said apparatus for suspending said base from a support includes generally hook-shaped members which are pivotally movable relative to the base.

* * * * *